(12) United States Patent
van den Elzen (10) Patent No.: US 9,363,025 B2
(45) Date of Patent: Jun. 7, 2016

(54) SIGNAL PROPAGATION SYSTEM AND METHOD OF REDUCING ELECTROMAGNETIC RADIATION EMISSIONS CAUSED BY COMMUNICATION OF TIMING INFORMATION

(75) Inventor: Jan Johannes Maria van den Elzen, Gemert (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 14/130,048

(22) PCT Filed: Jul. 2, 2012

(86) PCT No.: PCT/EP2012/062846
§ 371 (c)(1),
(2), (4) Date: Feb. 10, 2014

(87) PCT Pub. No.: WO2013/001095
PCT Pub. Date: Jan. 3, 2013

(65) Prior Publication Data
US 2015/0139376 A1 May 21, 2015

(30) Foreign Application Priority Data
Jun. 30, 2011 (GB) .................................. 1111169.7

(51) Int. Cl.
*H04L 7/00* (2006.01)
*H04B 15/02* (2006.01)
(Continued)

(52) U.S. Cl.
CPC ............. *H04B 15/02* (2013.01); *H04L 7/0008* (2013.01); *H04B 2215/064* (2013.01); *H04L 7/0012* (2013.01); *H04L 7/033* (2013.01); *H04L 2007/047* (2013.01)

(58) Field of Classification Search
CPC ..... H04L 7/0012; H04L 7/033; H04L 7/0337; H04L 7/0037
USPC .......................................................... 375/371
See application file for complete search history.

(56) References Cited

U.S. PATENT DOCUMENTS 5,224,484 A * 7/1993 Newell .......................... 600/493
5,517,532 A 5/1996 Reymond
(Continued)

FOREIGN PATENT DOCUMENTS

DE 10056192 A1 5/2002
EP 1139324 A2 10/2001
(Continued)

OTHER PUBLICATIONS

Search Report Issued Oct. 10, 2011 for Application GB1111169.7.
(Continued)

*Primary Examiner* — Santiago Garcia (57) ABSTRACT

A signal propagation system for communicating timing information comprises a processing resource (300) arranged to generate a first timing signal for communicating the timing information, the first timing signal having a first frequency spectrum associated therewith. An electronic circuit (110) is provided having an input for receiving the timing information. An electrical connection (310) between the processing resource (300) and the electronic circuit (110) is also provided. A signal transformation module (304) for communicating the timing information, and the signal transformation module (304) is arranged to translate the first timing signal into a second timing signal for communicating the timing information. The second timing signal has a second frequency spectrum associated therewith that comprises fewer harmonics than the first timing signal, thereby reducing electromagnetic energy emitted by the electrical connection.

15 Claims, 5 Drawing Sheets

(51) Int. Cl.
*H04L 7/033* (2006.01)
*H04L 7/04* (2006.01)

(56) References Cited

U.S. PATENT DOCUMENTS

| | | | |
|---|---|---|---|
| 5,818,884 | A | 10/1998 | Reymond |
| 6,035,184 | A | 3/2000 | Koh |
| 6,184,736 | B1 * | 2/2001 | Wissell et al. ............... 327/295 |
| 6,484,223 | B1 | 11/2002 | Lenz |
| 7,230,460 | B1 * | 6/2007 | Wan et al. .................... 327/156 |
| 7,502,433 | B1 * | 3/2009 | Sasaki et al. ................. 375/356 |
| 8,654,823 | B1 * | 2/2014 | Zhu et al. ..................... 375/220 |
| 2002/0186087 | A1 * | 12/2002 | Kim et al. ..................... 331/100 |
| 2003/0133715 | A1 | 7/2003 | Skillman |
| 2004/0141560 | A1 | 7/2004 | Koyasu |
| 2006/0023874 | A1 * | 2/2006 | Gilliland ........................ 380/28 |
| 2007/0217481 | A1 * | 9/2007 | Ko et al. ....................... 375/130 |
| 2007/0253495 | A1 * | 11/2007 | Kim .............................. 375/259 |
| 2008/0109672 | A1 * | 5/2008 | Godiwala et al. ............. 713/401 |
| 2009/0167390 | A1 * | 7/2009 | Morishita ...................... 327/161 |
| 2010/0124891 | A1 * | 5/2010 | Lin et al. ....................... 455/143 |
| 2010/0128830 | A1 * | 5/2010 | Yusa ............................. 375/354 |
| 2010/0315134 | A1 * | 12/2010 | Murari .......................... 327/145 |
| 2011/0176587 | A1 * | 7/2011 | Hayes ........................... 375/219 |
| 2013/0266053 | A1 * | 10/2013 | Tazaki .......................... 375/224 |

FOREIGN PATENT DOCUMENTS

| | | |
|---|---|---|
| GB | 1424525 A | 2/1976 |
| GB | 2320147 A | 6/1998 |
| JP | 2001285265 A | 10/2001 |
| WO | 0027079 A1 | 5/2000 |

OTHER PUBLICATIONS

International Search Report Issued Oct. 5, 2012 for International Application No. PCT/EP2012/062846.

* cited by examiner

SIGNAL PROPAGATION SYSTEM AND METHOD OF REDUCING ELECTROMAGNETIC RADIATION EMISSIONS CAUSED BY COMMUNICATION OF TIMING INFORMATION

CROSS-REFERENCES TO RELATED APPLICATIONS

This application is the National Stage of International Application No. PCT/EP2012/062846, filed on Jul. 2, 2012, and designating the United States. The application claims the benefit of United Kingdom Patent Application No. GB1111169.7 filed Jun. 30, 2011. The entire content of these applications is incorporated herein by reference.

FIELD OF THE INVENTION

The present invention relates to a signal propagation system of the type that, for example, is used to communicate timing information, such as between a driver circuit and a module to be driven via a cable connected therebetween. The present invention also relates to a method of reducing electromagnetic radiation emissions, the method being of the type that, for example, reduces electromagnetic radiation emissions caused by communication of timing information.

BACKGROUND TO THE INVENTION

Computing devices, for example navigation devices, which include Global Positioning System (GPS) signal reception and processing functionality are well known and are widely employed as in-car or other vehicle navigation systems.

In general terms, a modern navigation system comprises a processor, memory, and map data stored within said memory. The processor and memory cooperate to provide an execution environment in which a software operating system can be established, and additionally it is commonplace for one or more additional software programs to be provided to enable the functionality of the navigation system to be controlled, and to provide various other functions.

Typically, these devices further comprise one or more input interfaces that allow a user to interact with and control the device, and one or more output interfaces by means of which information may be relayed to the user. Illustrative examples of output interfaces include: a visual display and a speaker for audible output. Illustrative examples of input interfaces include: one or more physical buttons to control on/off operation or other features of the system (which buttons could be on a steering wheel), and a microphone for detecting user speech. In one particular arrangement, the output interface display may be configured as a touch sensitive display (by means of a touch sensitive overlay or otherwise) additionally to provide an input interface by means of which a user can operate the device through the display.

Devices of this type will also often include one or more physical connector interfaces by means of which power and optionally data signals can be transmitted to and received from the system, and optionally one or more wireless transmitters/receivers to allow communication over cellular telecommunications and other signal and data networks, for example Bluetooth, Wi-Fi, Wi-Max, GSM, UMTS and the like.

Navigation systems of this type also include or are coupled to a GPS antenna by means of which satellite-broadcast signals, including location data, can be received and subsequently processed to determine a current location of the system.

The navigation system may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems.

In this respect, in recent years it has become common to integrate display devices into the dashboard of vehicles to support various systems, for example, entertainment systems, so-called "infotainment" systems, and/or navigation systems. Typically, in integrated systems of this type, the display module (or display screen) is located separately from one or more display drivers and other processing resources used to supply timing information, display information and to control the display module. Consequently, the display module and driver(s) are connected by means of a cable, for example a ribbon cable.

It is known that clock and data signals applied to the cable between the display driver(s) and the display module result in electromagnetic radiation being emitted from the cable. With the ever improving graphics capabilities of display screens, the rate at which clock and data signals are required to pass along the cable is also increasing, and thus the amount of electromagnetic radiation emissions is increasing too. In this respect, as the frequency of the clock signal increases, for example from about 10 MHz in previous generation systems to about 30 MHz, propagation of the faster clock signal over the cable connecting the display driver(s) and the display module results in an increase in the electromagnetic radiation emissions. In this respect, the clock signal is a repetitive and comprises multiple overtones constituting narrow band interference. The maximum frequency of the data signals is half the clock frequency and changes state randomly, resulting in significantly lower levels of electromagnetic radiation emissions that are spread over the frequency band. Generally speaking, an increase in the clock frequency by a factor x results in an increase in the emission of electromagnetic radiation by a factor of about $x^2$.

In various industries, techniques are required to reduce the electromagnetic radiation emissions to an acceptable level. For example, in the automotive industry, strict requirements exist concerning permissible levels of electromagnetic radiation emission by electronic devices. In this respect, one exemplary standard is that set out by the Comité International Spécial des Perturbations Radioélectriques (CISPR) of the International Electrotechnical Commission (IEC), namely the CISPR-25 standard entitled "Radio disturbance characteristics for the protection of receivers used on board vehicles, boats, and on devices—Limits and methods of measurement". This standard sets out techniques that can be used to limit electromagnetic radiation emissions, for example: clock and data line filtering; maintaining the distance between the driver and display module as short as possible, such as below 4 cm; providing shielding over or around the cable; making a low impendence ground connection between the driver, in particular the display driver Printed Circuit Board (PCB), and the display module; and physically integrating the driver with the display module.

However, reduction of the increased electromagnetic radiation emissions resulting from increased clock speeds to those required by, for example the automotive industry, using traditional methods described above is prohibitively costly.

Without control of electromagnetic radiation emissions, however, malfunctions of other, possibly critical, in-vehicle systems may occur.

SUMMARY OF THE INVENTION

According to a first aspect of the present invention, there is provided a signal propagation system for communicating timing information, the system comprising: a processing resource arranged to generate a first timing signal for communicating the timing information, the first timing signal having a first frequency spectrum associated therewith; an electronic circuit having an input for receiving the timing information; an electrical connection between the processing resource and the electronic circuit; and a signal transformation module for communicating the timing information; wherein the signal transformation module is arranged to translate the first timing signal into a second timing signal for communicating the timing information, the second timing signal having a second frequency spectrum associated therewith that comprises fewer harmonics than the first timing signal, thereby reducing electromagnetic energy emitted by the electrical connection.

The first timing signal may have a first central frequency associated therewith. The second timing signal may have a second central frequency associated therewith. The second timing signal may have fewer harmonics or overtones above the central frequency thereof than the first timing signal has above the central frequency thereof.

The rise time of the second timing signal may be greater than the rise time of the first timing signal.

The signal transformation module may be arranged to translate the first timing signal from the digital domain to the analogue domain, thereby yielding the second timing signal.

The second timing signal may be substantially sinusoidal.

The first timing signal may be substantially a square wave. The first timing signal may be a clock signal.

The signal transformation module may comprise a Chebychev filter. The Chebychev filter may be a third order filter.

The system may further comprise: a timing signal regeneration module arranged to receive the second timing signal and substantially to reconstitute the first signal from the second timing signal.

The timing signal regeneration module may comprise a square wave generator.

The electrical connection may be a wire. The wire may be part of a ribbon cable. Alternatively, the electrical connection may be or include a track of a circuit board.

The system may further comprise another electrical connection between the processing resource and the electronic circuit; the processing resource may be arranged to communicate a data signal to the electronic circuit via the another electrical connection; and a delay module arranged to receive the data signal and apply a first time delay to the data signal, the first time delay corresponding substantially to a second time delay experienced by the timing information.

The another electrical connection may be another wire. The wire may be part of the ribbon cable. Alternatively, the another electrical connection may be another track of the circuit board.

The signal transformation module may comprise the delay module. The delay module may comprise a filter. The filter may be a low-pass filter.

According to a second aspect of the present invention, there is provided a signal propagation system for communicating timing information, the system comprising: a processing resource arranged to generate a first timing signal for communicating the timing information, the first timing signal having a first frequency spectrum associated therewith; an electronic circuit having an input for receiving the timing information; an electrical connection between the processing resource and the electronic circuit; another electrical connection between the processing resource and the electronic circuit, the processing resource being arranged to communicate a data signal to the electronic circuit via the another electrical connection; a delay module arranged to receive the data signal and to apply a first time delay to the data signal; and a signal transformation module for communicating the timing information, the signal transformation module being arranged to apply a second time delay to the timing information and to translate the first timing signal into a second timing signal for communicating the timing information; wherein the second timing signal has a second frequency spectrum associated therewith that comprises fewer harmonics than the first timing signal, thereby reducing electromagnetic energy emitted by the electrical connection; and the first time delay corresponds substantially to the second time delay.

According to a third aspect of the present invention, there is provided a method of reducing electromagnetic radiation emissions caused by communication of timing information, the method comprising: a processing resource generating a first timing signal, the first timing signal having a first frequency spectrum associated therewith; and translating the first timing signal into a second timing signal in order to communicate the timing information to an electronic circuit via an electrical connection, the second timing signal having a second frequency spectrum associated therewith that comprises fewer harmonics than the first timing signal, thereby reducing electromagnetic radiation emitted by the electrical connection.

It is thus possible to provide an apparatus and method that results in lower emissions of electromagnetic radiation than electromagnetic radiation emissions associated with a digital signal propagating over a medium, for example a wire or a cable, between the processing resource and the electronic circuit. Furthermore, the apparatus and method allows signals, for example timing signals, of increasing frequency to be communicated.

The apparatus and method obviates the need for a galvanic connection between the processing resource and the electronic circuit, thereby increasing flexibility of system configuration. In this respect, for example, a required length of cable or wire can be employed to connect the processing resource to the electronic circuit.

Additionally, the apparatus and method set forth herein results in reduced manufacturing costs, because use of expensive shielding foils, for example, can be avoided.

Further advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Throughout the following description identical reference numerals will be used to identify like parts.

Embodiments of the present invention will now be described in the context of a navigation system generating image data that needs to be displayed by a display device, for example a Liquid Crystal Module (LCM), whilst conforming to a maximum level of electromagnetic radiation emissions. However, It should be remembered that the teachings of the present invention are not limited to communication of data relating to navigation systems and display modules, but are instead universally applicable to any sources of information that needs to be communicated over an electrically conductive medium to an electronic circuit whilst minimising emissions of electromagnetic radiation, particularly attributable to communication of timing information. It follows therefore that in the context of the present application, a processing resource is intended to include (without limitation) any resource that is capable of supporting output of timing information that is to be communicated to an electronic circuit for use thereof, irrespective of whether that processing resource is part of a navigation system in a vehicle, such as an automobile, or indeed any other computing resource capable of executing route planning and navigation software or not. Hence, it will also be apparent from the following that the teachings of the present invention even have utility in circumstances where a user is not seeking instructions as to how to navigate from one point to another.

Figure 1:
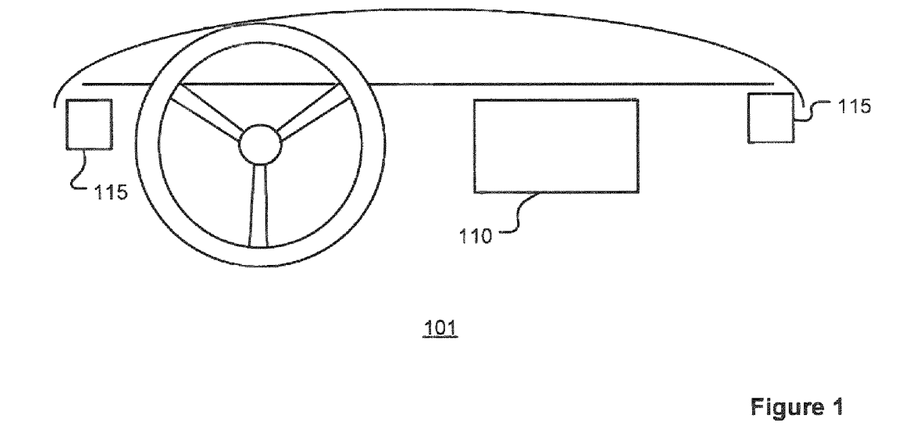
FIG. 1 is a schematic diagram of an interior of a vehicle that employs a signal communication system (not shown) constituting an embodiment of the invention.

Referring to FIG. 1, in the following examples, the signal communication system (not shown) is to be used in a vehicle, for example an automobile 101 having a navigation system, which is coupled to an LCM 110 and a loudspeaker system 115. However, the skilled person should appreciate that the navigation system can be deployed in other environments, for example on a motorcycle, an aircraft or a sea-faring vessel.

Figure 2:
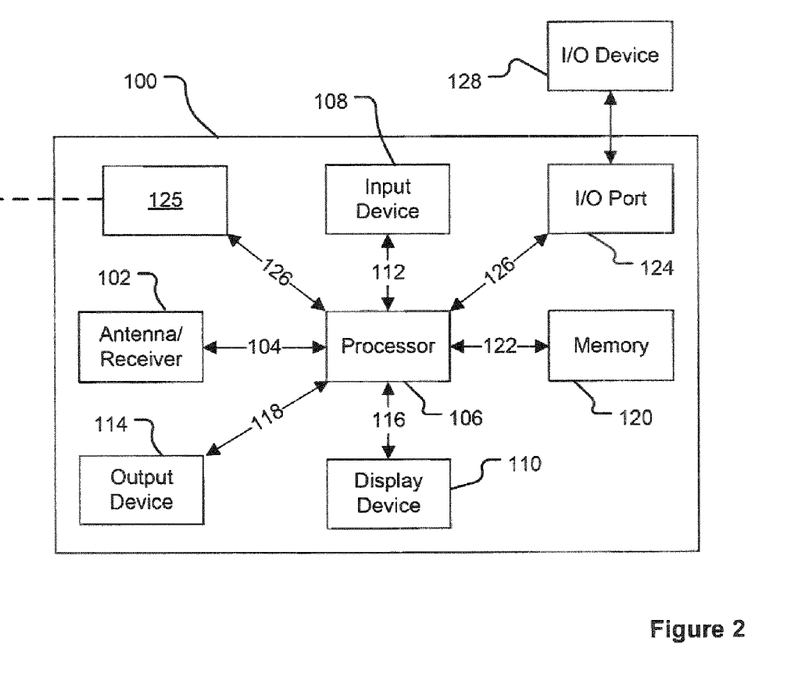
FIG. 2 is a schematic illustration of components of a navigation system that uses a display module of FIG. 1.

Referring to FIG. 2, a navigation system 100 comprises or is coupled to a GPS receiver device 102 via a connection 104, wherein the GPS receiver device 102 can be, for example, a GPS antenna/receiver. It should be understood that the antenna and receiver designated by reference numeral 102 are combined schematically for illustration, but that the antenna and receiver may be separately located components, and that the antenna may be a GPS patch antenna or helical antenna for example.

The navigation system 100 includes a processor 106, the processor 106 being coupled to an input device 108 and a display device, for example the display screen 110. Although reference is made here to the input device 108 in the singular, the skilled person should appreciate that the input device 108 represents any number of input devices, including a keyboard device, voice input device, touch panel and/or any other known input device used to input information. Likewise, the display screen 110 can include any type of display screen for example the LCM mentioned above.

In one arrangement, one aspect of the input device 108, the touch panel, and the display screen 110 can be integrated so as to provide an integrated input and display device, including a touchpad or touchscreen input to enable both input of information (via direct input, menu selection, etc.) and display of information through the touch panel screen so that a user need only touch a portion of the display screen 110 to select one of a plurality of display choices or to activate one of a plurality of virtual or "soft" buttons. In this respect, the processor 106 can supports a Graphical User Interface (GUI) that operates in conjunction with the touchscreen. However, in the example described herein, touch panel-related functionality is not provided.

In the navigation system 100, the processor 106 is operatively connected to and capable of receiving input information from input device 108 via a connection 112, and operatively connected to at least one of the display screen 110 and an output device 114, for example an audible output device, for example the loudspeaker 115, via respective connections, for example output connections 116, 118. The connection 116 will be described in further detail later herein.

As the output device 114 can produce audible information for a user of the navigation system 100, it should equally be understood that the input device 108 can include a microphone and software for receiving input voice commands. Further, the navigation system 100 can also include any additional input device 108 and/or any additional output device, for example audio input/output devices.

The processor 106 is operatively connected to a memory resource 120 via connection 122 and is further arranged to receive/send information from/to input/output (I/O) port 124 via connection 126, wherein the I/O port 124 is connectible to an I/O device 128 external to the navigation system 100. The memory resource 120 comprises, for example, a volatile memory, such as a Random Access Memory (RAM) and a non-volatile memory, for example a digital memory, such as a flash memory.

The external I/O device 128 may include, but is not limited to, a wired or wireless connection to any other external device, for example a car stereo unit, for connection to an earpiece or headphones, and/or for connection to a mobile telephone; the mobile telephone connection can be used to establish a data connection between the navigation system 100 and the Internet or any other network for example, and/or to establish a connection to a server via the Internet or some other network for example.

In this regard, the navigation system 100 is capable of establishing a data session, if required, with network hardware of a "mobile" or telecommunications network via a mobile device (not shown), for example the mobile telephone described above, a PDA and/or any device comprising mobile telephone technology, in order to establish a digital connection, for example a digital connection via known Bluetooth technology. Thereafter, through a network service provider associated therewith, the mobile device can establish a network connection (through the Internet for example) with a server (not shown). As such, a "mobile" network connection can be established between the navigation system 100 and the server to provide a "real-time" or at least very "up to date" gateway for information.

It will, of course, be understood by one of ordinary skill in the art that the electronic units schematically shown in FIG. 2 are powered by one or more power sources (not shown) in a conventional manner. As will also be understood by one of ordinary skill in the art, different configurations of the units shown in FIG. 2 are contemplated. For example, the components shown in FIG. 2 may be in communication with one another via wired and/or wireless connections and the like. Thus, the navigation system 100 described herein can be a portable or handheld navigation system 100.

It should also be noted that the block diagram of the navigation system 100 described above is not inclusive of all components of the navigation system 100, but is only representative of many example components.

Figure 3:
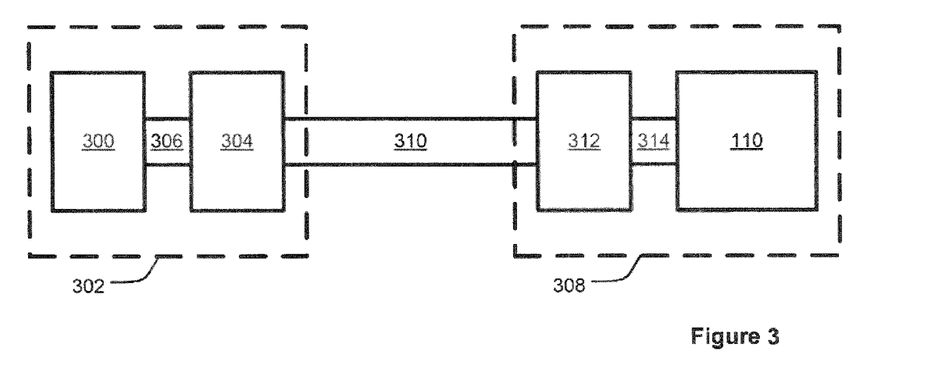
FIG. 3 is a schematic diagram of the signal communication system of FIG. 1.

Turning to FIG. 3, the processor 106 needs to communicate information to the LCM 110 and as such comprises a driver circuit for driving the LCM 110. Due to requirements of the manufacturer of the automobile 101, the driver circuit is located separately from the LCM 110. The driver circuit is an example of a processing resource 300 that is capable of outputting information to be received by the LCM 110, which constitutes an electronic circuit to be, for example, driven. The processing resource 300 comprises, in this example, a Texas Instruments (TI) OMAP processor that is arranged to generate a first timing signal, for example a clock signal. The processing resource 300 is also arranged to generate signals, for example image-related data signals, for driving the LCM 110. However, in order not to distract from the teachings described herein, the manner of generation of the timing signals and the data signals will not be described further herein as it is not central to the salient aspects of signal communication system. In this example, the processing resource 300 is disposed on a first Printed Circuit Board (PCB) 302 upon which a signal transformation module 304 is also disposed, the processing resource 300 being coupled to the signal transformation module 304 by first tracks 306 of the first PCB 302. The signal transformation module 304 is coupled to a connector (not shown) of the first PCB 302 and the first PCB 302 is coupled to a corresponding connector (not shown) of a second PCB 308. The first PCB 302 is coupled to the second PCB 308 by a cable, for example a flat or ribbon cable, constituting an electrical connection between the signal transformation module 304 and the electrical circuit 110. In the example, the ribbon cable is about 5 cm long. As is well known, the ribbon cable 310 comprises a plurality of wires, a first wire being used for communicating the timing information, and constituting a timing signal line. It should be appreciated that the electrical connection need not be the cable and can be one or more tracks of a circuit board or any other carrier using a conductor as a medium for propagating a signal, or need not be the cable alone and can include one or more tracks of a circuit board.

The corresponding connector is coupled to a signal regeneration module 312, the signal regeneration module 312 being coupled to the LCM 110 by second tracks 314 of the second PCB 308.

Figure 4:
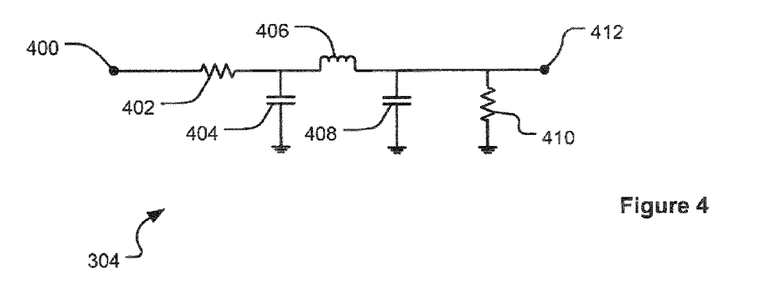
FIG. 4 is a circuit diagram of a signal transformation module of the system of FIG. 3.

Turning to FIG. 4, in respect of the timing signal line, the signal transformation module 304 comprises a first input terminal 400 coupled the processing resource 300, in particular an output terminal of the processing resource 300 from which the timing signal is output. The first input terminal 400 is also coupled to a first terminal of a first resistor 402, a second terminal of the first resistor 402 being coupled to a first terminal of a first capacitor 404 and a first terminal of an inductor 406. A second terminal of the first capacitor 404 is coupled to ground potential and the second terminal of the inductor 406 is coupled to a first terminal of a second capacitor 408, a first terminal of a second resistor 410 and a first output terminal 412. The second terminal of the second capacitor 408 and the second terminal of the second resistor 410 are both respectively coupled to ground potential. The first output terminal 412 is coupled to a terminal of the connector of the first PCB 302. In this example, the above-described circuit constitutes a Chebychev filter, for example a third-order Chebychev filter. However, any suitable processing circuit can be used that removes overtones to yield a sinusoidal wave, for example any suitable low-pass filter that has a cut-off substantially just above the fundamental frequency of the sine wave, such as a Butterworth filter.

The signal transformation module 304 also comprises a delay module, for example a filter, such as a low-pass filter circuit, for applying a delay to the data signals.

Figure 5:
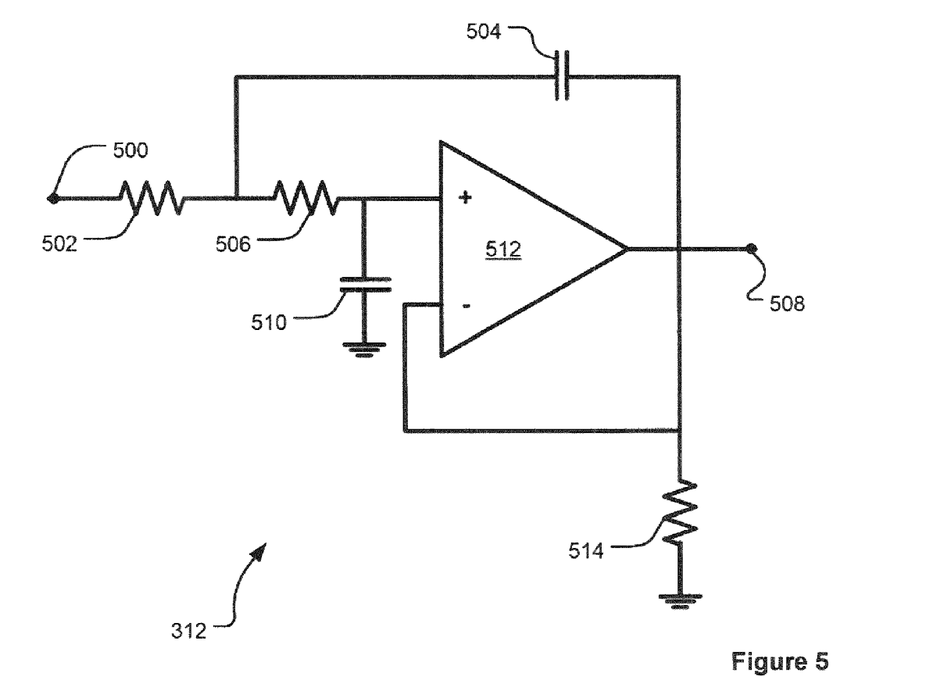
FIG. 5 is a circuit diagram of a signal regeneration module of the system of FIG. 3.

Referring to FIG. 5, the signal regeneration module 312 comprises a square wave generator. In this respect, the square wave generator comprises a second input terminal 500 coupled to the corresponding connector of the second PCB 308 mentioned above. The second input terminal 500 of the square wave generator is coupled to a first terminal of a third resistor 502, a second terminal of the third resistor 502 being coupled to a first terminal of a third capacitor 504 and a first terminal of a fourth resistor 506. A second terminal of the third capacitor 504 is coupled to a second output terminal 508, and a second terminal of the fourth resistor 506 is coupled to a first terminal of a fourth capacitor 510 and a non-inverting input of an operational amplifier 512. An output of the operational amplifier 512 is coupled to the second output terminal 508 and the second terminal of the fourth capacitor 510 is couple to ground potential. A non-inverting input of the operational amplifier 512 is coupled to the second output terminal 508 and a first terminal of a fifth resistor 514, a second terminal of the fifth resistor 514 being coupled to ground potential.

In operation (FIGS. 6 and 7), the processing resource 300 generates (Step 600) a first timing signal 700. In this example, the first timing signal 700 is a digital signal, such as a square wave, and has a first frequency spectrum associated therewith. The first timing signal 700, being digital, comprises multiple frequency harmonics. In this example, the frequency of the first timing signal is greater than about 10 MHz, for example greater than about 15 MHz, such as about 30 MHz. As the frequency of the first timing signal 700 increases the rise and fall times of transitions of the timing signal decreases and as such the first timing signal comprises an increasing number of frequency harmonics above a central frequency of the first timing signal as the frequency of the first timing signal is increased. The increase in the frequency harmonics causes the strength of the electromagnetic radiation emitted by the timing signal line to increase. However, it should be appreciated that the embodiments described herein also provide benefits where the signal frequency is lower than the frequencies recited above.

Figure 6:
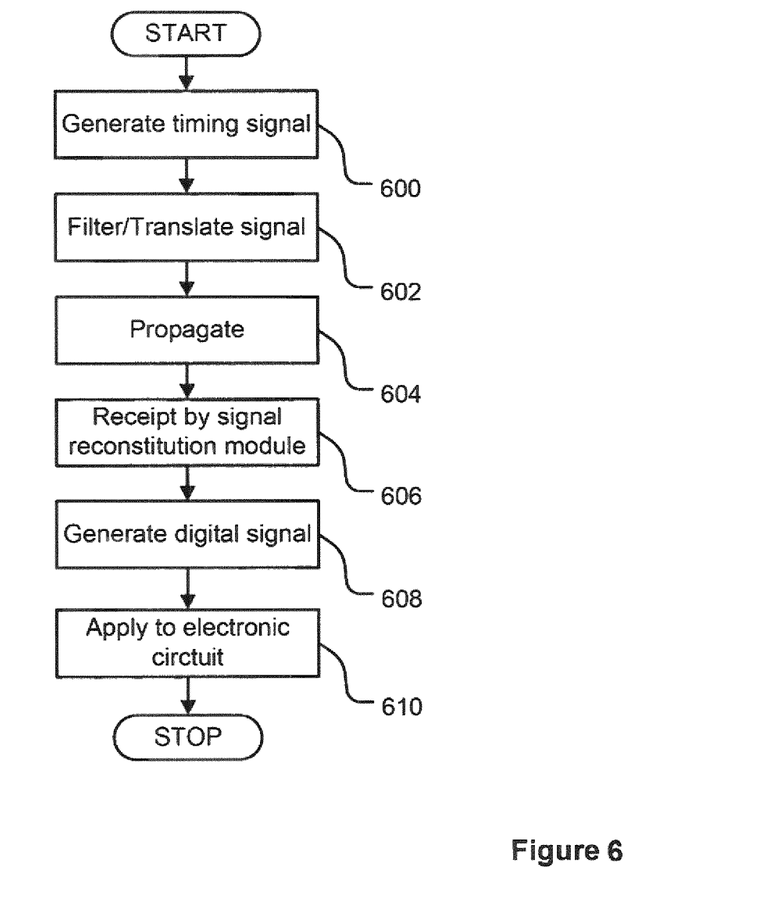
FIG. 6 is a flow diagram of a method of reducing electromagnetic radiation emissions employed by the system of FIG. 3.
Figure 7:
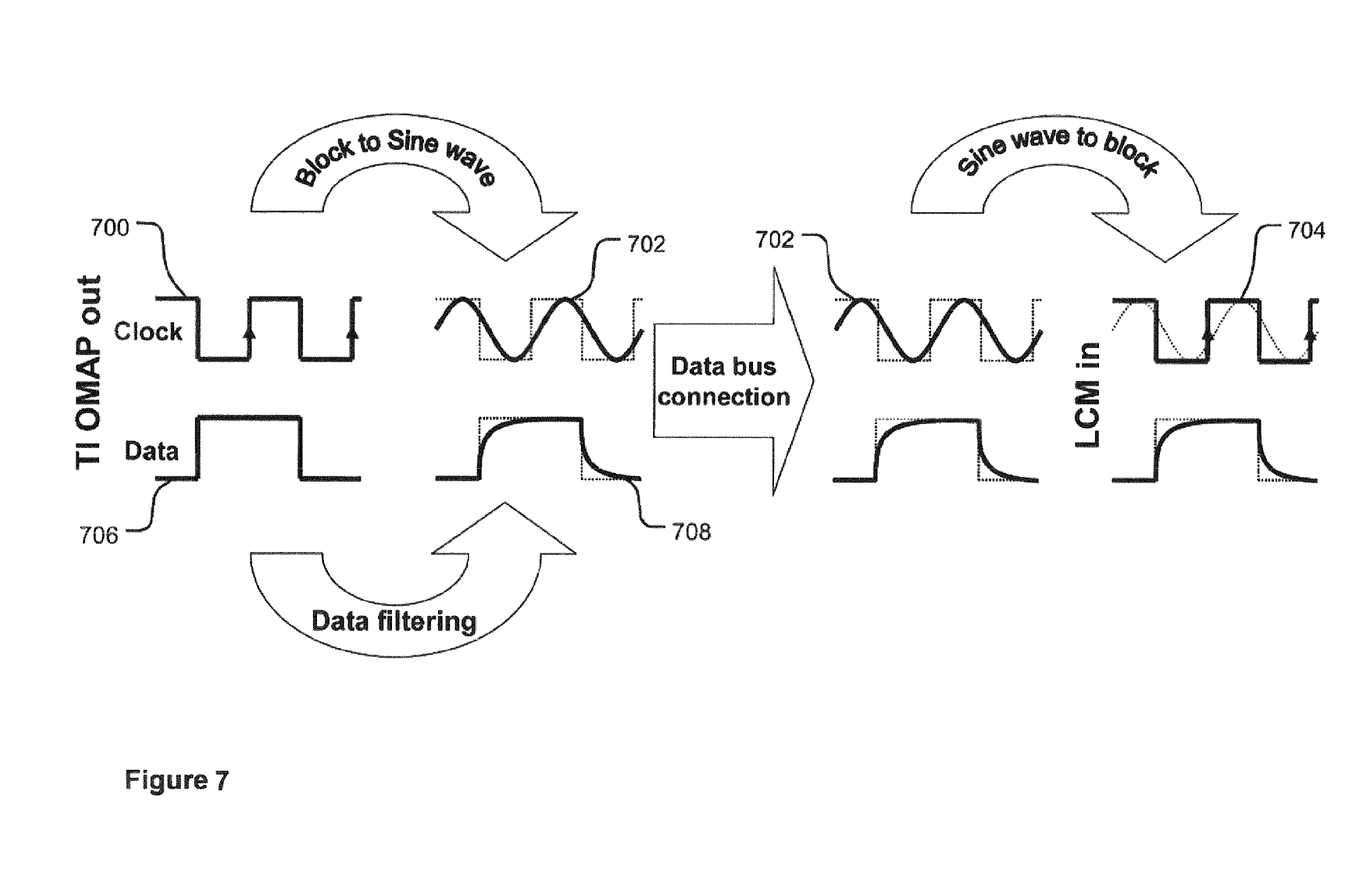
FIG. 7 is a schematic illustration of signal processing employed by the method of FIG. 6.

The signal transformation module 304 translates the first timing signal 700 into a second timing signal 702 in response to receipt of the first timing signal 700, the second timing signal 702 having a second frequency spectrum associated therewith. In this respect, the signal transformation module 304 filters (Step 602) the first timing signal 700 in order to yield the second timing signal 702. The filtration of the first timing signal 700 attenuates a number of the frequency harmonics above the central frequency of the first timing signal 700. The second timing signal 702 that results is therefore an analogue signal, for example a substantially sinusoidal signal. Hence, the rise time and/or the fall time of the second timing signal is greater than the rise time and/or fall time of the first timing signal.

Once the second timing signal 702 is output by the signal transformation module 304, the second timing signal 702 propagates (Step 604) over the timing signal line for receipt (Step 606) by the signal regeneration module 312. Thereafter, the square wave generator of the signal reconstitution module 312 responds to, for example is triggered by, the second timing signal 702 and generates (Step 608) a digital pulse in response to each rising edge of the analogue second timing signal. The output of the signal regeneration module 312 is therefore a digital signal 704 of substantially the same form as the first timing signal 700.

The resulting digital signal 704 output by the signal regeneration module 312 is then applied (Step 610) to the LCM 110 and the reconstituted first timing signal 700, 704 is used by the LCM 110 as a source of synchronism in order to process correctly the image-related data signals, mentioned above, communicated over the cable 310 to the LCM 110 in order to achieve display of one or more images.

As the first timing signal 700 is delayed by the treatment thereof by the signal transformation module 304 and the signal regeneration module 312, it is necessary to ensure synchronism between the data signals 708 communicated from the processing resource 300 to the LCM 110 and the timing signals. The data signals 708 are also therefore subjected to filtration by the low pass filter of the signal transformation module 304 in order to apply a first delay to the data signal 708 by an amount of time substantially corresponding to a second delay experienced by the timing information as a result of the translation of the timing information and subsequent conversion thereof back to the digital domain. The data signal thus substantially maintains synchronism with the timing signal. In this respect, the data signal needs to be stable in order to ensure reliable "reading" of the data.

It should be appreciated that although it is known the filter clock signal and data signals, such filtering of the clock signal needs to fulfil a signal integrity constraint relating to maintaining the rise and fall times of the digital clock signal. However, in the examples set forth herein, the conversion of the first timing signal to the second timing signal does not have to conform to the signal integrity constraint because the first timing signal is reconstituted.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments have been described in the context of the navigation system using the display device 110, the above embodiments are applicable to other systems, for example information systems and/or infotainment systems.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location, for example the long range navigation (LORAN)-C system.

By way of further example, although a single LCM is being driven in the examples set out herein, it should be appreciated that multiple devices, for example LCMs, using the techniques disclosed herein.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A signal propagation system for communicating timing information, the system comprising:
    a processing resource arranged to generate a first timing signal for communicating the timing information, the first timing signal having a first frequency spectrum associated therewith;
    an electronic circuit having an input for receiving the timing information;
    a first electrical connection between the processing resource and the electronic circuit; and
    a signal transformation module for communicating the timing information and arranged to translate the first timing signal into a second timing signal for communicating the timing information, the translating comprising using the first timing signal to create the second timing signal having a waveform of a different shape than the first timing signal, the second timing signal having a second frequency spectrum associated therewith that comprises fewer harmonics than the first timing signal, thereby reducing electromagnetic energy emitted by the electrical connection,
    a second electrical connection between the processing resource and the electronic circuit, the processing resource being arranged to communicate a data signal to the electronic circuit via the second electrical connection; and
    a delay module arranged to receive the data signal and apply a first time delay to the data signal, the first time delay corresponding substantially to a second time delay experienced by the timing information.

2. A system as claimed in claim 1, wherein the signal transformation module comprises the delay module.

3. A system as claimed in claim 1, wherein the delay module comprises a filter.

4. A system as claimed in claim 1, wherein the first timing signal has a first central frequency associated therewith;
    the second timing signal has a second central frequency associated therewith; and
    the second timing signal has fewer harmonics above the central frequency thereof than the first timing signal has above the central frequency thereof.

5. A system as claimed in claim 1, wherein the rise time of the second timing signal is greater than the rise time of the first timing signal.

6. A system as claimed in claim 1, wherein the signal transformation module is arranged to translate the first timing signal from the digital domain to an analogue domain, thereby yielding the second timing signal.

7. A system as claimed in claim 1, wherein the second timing signal is substantially sinusoidal.

8. A system as claimed in claim 1, wherein the first timing signal is substantially a square wave.

9. A system as claimed in claim 1, wherein the first timing signal is a clock signal.

10. A system as claimed in claim 1, wherein the signal transformation module comprises a Chebychev filter.

11. A system as claimed in claim 10, wherein the Chebychev filter is a third order filter.

12. A system as claimed in claim 1 further comprising:
a timing signal regeneration module arranged to receive the second timing signal and substantially to reconstitute the first signal from the second timing signal.

13. A system as claimed in claim 12, wherein the timing signal regeneration module comprises a square wave generator.

14. A method of reducing electromagnetic radiation emissions caused by communication of timing information, the method comprising:
a processing resource generating a first timing signal, the first timing signal having a first frequency spectrum associated therewith; and
translating the first timing signal into a second timing signal in order to communicate the timing information to an electronic circuit via a first electrical connection, the translating comprising using the first timing signal to create the second timing signal having a waveform of a different shape than the first timing signal, the second timing signal having a second frequency spectrum associated therewith that comprises fewer harmonics than the first timing signal, thereby reducing electromagnetic radiation emitted by the electrical connection,
the processing resource communicating a data signal to the electronic circuit via a second electronic connection;
applying a first time delay to the data signal, the first time delay corresponding substantially to a second time delay experienced by the tinning information; and
displaying one or more images on a display by using a reconstituted first timing signal and the delayed data signal.

15. A non-transitory computer-readable medium which stores a set of instructions which when executed performs a method of reducing electromagnetic radiation emissions caused by communication of timing information, the method executed by the set of instructions comprising:
generating a first timing signal, the first timing signal having a first frequency spectrum associated therewith; and
translating the first timing signal into a second timing signal in order to communicate the timing information to an electronic circuit via a first electrical connection, the translating comprising using the first timing signal to create the second timing signal having a waveform of a different shape than the first timing signal, the second timing signal having a second frequency spectrum associated therewith that comprises fewer harmonics than the first timing signal, thereby reducing electromagnetic radiation emitted by the electrical connection,
communicating a data signal to the electronic circuit via a second electronic connection;
applying a first time delay to the data signal, the first time delay corresponding substantially to a second time delay experienced by the tinning information; and
displaying one or more images on a display by using a reconstituted first timing signal and the delayed signal.

* * * * *